United States Patent
Guimet et al.

(10) Patent No.: US 11,933,403 B2
(45) Date of Patent: Mar. 19, 2024

(54) METALLIC SEALING ASSEMBLY FOR SEALING BETWEEN A ROTATING SHAFT AND A FIXED FRAME

(71) Applicants: COMMISSARIAT À L'ÉNERGIE ATOMIQUE ET AUX ÉNERGIES ALTERNATIVES, Paris (FR); TECHNETICS GROUP FRANCE SAS, Saint Etienne (FR)

(72) Inventors: Laurent Guimet, Unieux (FR); Jean-François Juliaa, Montelimar (FR); Michel Lefrancois, Saint Etienne (FR); Christophe Darles, Venejan (FR); Olivier Constant, Aurec sur Loire (FR)

(73) Assignees: COMMISSARIAT À L'ÉNERGIE ATOMIQUE ET AUX ÉNERGIES ALTERNATIVES, Paris (FR); TECHNETICS GROUP FRANCE SAS, Saint Etienne (FR)

( * ) Notice: Subject to any disclaimer, the term of this patent is extended or adjusted under 35 U.S.C. 154(b) by 452 days.

(21) Appl. No.: 17/043,799

(22) PCT Filed: Apr. 1, 2019

(86) PCT No.: PCT/FR2019/050752
§ 371 (c)(1),
(2) Date: Sep. 30, 2020

(87) PCT Pub. No.: WO2019/193273
PCT Pub. Date: Oct. 10, 2019

(65) Prior Publication Data
US 2021/0018098 A1    Jan. 21, 2021

(30) Foreign Application Priority Data

Apr. 4, 2018 (FR) .................................. 1852925

(51) Int. Cl.
*F16J 15/32* (2016.01)
*F16J 15/3212* (2016.01)
(Continued)

(52) U.S. Cl.
CPC ........... *F16J 15/32* (2013.01); *F16J 15/3212* (2013.01); *F16J 15/3248* (2013.01); *F16J 15/3276* (2013.01)

(58) Field of Classification Search
CPC ...... F16J 15/32; F16J 15/3276; F16J 15/3248; F16J 15/3212; F16J 15/3208; F16J 15/54; F16J 15/0893
See application file for complete search history.

(56) References Cited

U.S. PATENT DOCUMENTS

| 3,820,799 A | 6/1974 | Abbes et al. |
| 4,194,749 A | 3/1980 | Bonafous |

(Continued)

FOREIGN PATENT DOCUMENTS

| CN | 102853093 A1 | 1/2013 |
| FR | 2151186 A1 | 4/1973 |

(Continued)

OTHER PUBLICATIONS

International Search Report for PCT/FR2019/050752 dated May 16, 2019.

(Continued)

*Primary Examiner* — Eugene G Byrd
*Assistant Examiner* — L. Susmitha Koneru
(74) *Attorney, Agent, or Firm* — Pearne & Gordon LLP (57) ABSTRACT

A metallic sealing assembly between a rotating shaft and a fixed frame comprises: a flexible metallic seal having two tori, inner and outer, that are concentric and of different average diameters, comprising a metal envelope which encases and holds the inner and outer tori; a shaft rotating (Continued)

about an axis of rotation, comprising an annular shoulder against which the seal comes to press; a counter-face, comprising a contact face against which the seal comes to press; a wedge block positioned around the rotating shaft such that the seal is held between the wedge block and the contact face, the wedge block mounted to slide on the rotating shaft; a metal part which forms a cap through which the rotating shaft passes and which is secured to the frame and/or to the counter-face, the rotating shaft being free to rotate with respect to the cap and axially secured to the cap.

17 Claims, 8 Drawing Sheets

(51) Int. Cl.
  *F16J 15/3248* (2016.01)
  *F16J 15/3276* (2016.01)

(56) References Cited

U.S. PATENT DOCUMENTS

| | | | |
|---|---|---|---|
| 4,477,057 A | 10/1984 | Friess | |
| 5,639,100 A * | 6/1997 | Garrigues | F16L 23/20 |
| | | | 277/614 |
| 5,655,752 A * | 8/1997 | De Villepoix | F16J 15/0893 |
| | | | 251/359 |
| 7,360,769 B2 * | 4/2008 | Bennett | F16J 15/0812 |
| | | | 277/653 |
| 7,428,912 B2 | 9/2008 | Pozzati et al. | |
| 10,550,706 B2 * | 2/2020 | Lutjen | F01D 11/005 |
| 2005/0179215 A1 * | 8/2005 | Kono | F16J 15/0887 |
| | | | 277/628 |
| 2008/0075223 A1 * | 3/2008 | Ohsono | F16J 15/0893 |
| | | | 376/272 |
| 2012/0258384 A1 | 10/2012 | Reytier et al. | |
| 2013/0026715 A1 | 1/2013 | Guimet et al. | |
| 2013/0292910 A1 | 11/2013 | Tocheport et al. | |
| 2015/0226331 A1 | 8/2015 | Guimet et al. | |
| 2016/0115813 A1 * | 4/2016 | Davis | F01D 11/005 |
| | | | 277/592 |
| 2016/0298476 A1 * | 10/2016 | Lutjen | F01D 9/04 |
| 2017/0299071 A1 | 10/2017 | Guimet et al. | |

FOREIGN PATENT DOCUMENTS

| | | |
|---|---|---|
| FR | 2331725 A1 | 6/1977 |
| FR | 2398940 A1 | 2/1979 |
| FR | 2496217 A1 | 6/1982 |
| FR | 2541416 A1 | 8/1984 |
| FR | 2721085 A1 | 12/1995 |
| FR | 2615580 A1 | 11/1998 |

OTHER PUBLICATIONS

Written Opinion for PCT/FR2019/050752 dated May 16, 2019.
Search Report for French application No. FR 1852925 dated Dec. 3, 2018.

* cited by examiner

METALLIC SEALING ASSEMBLY FOR SEALING BETWEEN A ROTATING SHAFT AND A FIXED FRAME

CROSS-REFERENCE TO RELATED APPLICATIONS

This is a National Stage application of PCT international application PCT/FR2019/050752, filed on Apr. 1, 2019, which claims the priority of French Patent Application No. 1852925, filed Apr. 4, 2018 both of which are incorporated herein by reference in their entireties.

TECHNICAL FIELD

The present invention relates to the field of metallic sealing assemblies dedicated to the sealing of rotating rods.

It has uses in various industrial fields, and advantageously for carrying out the external sealing of valves with a rotating shaft, at the rod.

The invention thus relates to a metallic sealing assembly for sealing between a rotating shaft and a fixed frame.

PRIOR ART

The sealing of rotating shafts can be carried out in various manners. In uses for which the temperatures do not exceed 250 to 300° C., multiple solutions, comprising elastomers or polymers, exist and have proven their reliability.

However, beyond these temperatures, or because of the contact with chemical elements incompatible with these elastomers or polymers, stuffing-box systems, frequently containing graphite, or mechanical seals, the secondary sealing of which is moreover very often made of graphite, are regularly used. These solutions, practical and sometimes economical, nevertheless have several disadvantages. First of all, their sealing performance remains limited, the leakage rate not going below $10^{-5}$ $Pa \cdot m^3 \cdot s^{-1}$, this value being a best case, to be further nuanced according to the precise service conditions. Likewise, it can happen that, despite its very large spectrum of chemical compatibility, graphite is nevertheless incompatible with the fluid to be sealed. For example, graphite is incompatible with liquid sodium.

Also, in the case in which the use of graphite, of polymers or of elastomers is not possible, the solutions become rarer and sometimes very specific to the use.

For example, in the French patent application FR 2 541 416 A1, a solution is described precisely for being able to seal liquid sodium. The principle is to use a so-called "solidified" joint. Between the pipe and the graphite stuffing box there is a space cooled via external fins. The sodium, being cooled in this buffer zone, thus creates its own sealed barrier. This system has, however, disadvantages. First of all, the length of the required heat-exchange surface imposes having a massive, heavy and notably bulky valve top. Moreover, if the valve must be manoeuvred regularly, the zone of the sodium plug in contact with the shaft can be degraded rapidly. The sodium, still liquid, can thus easily bead up to the upper stuffing box.

Another type of solution involves creating metallic sealing joints comprising at least one inner lip, coming into contact with the shaft. This principle is moreover widely used with elastomers: the inner diameter of the lip is less than that of the shaft and the hyper-elasticity of the material is thus used to create a contact pressure of the lip on the shaft. However, extending this principle with a metallic material has numerous disadvantages: since this material is not hyper-elastic, the tolerance in terms of diameter of both the shaft and the lip must be very tight. There is also a very high sensitivity to the variations in circularity of the shaft, the lip being by nature too rigid to compensate for them. Finally, the sealing can only be obtained via a significant contact pressure, generating a manoeuvring torque that is sometimes significant, and especially very difficult to control.

It has been proposed to adapt to such disadvantages as described for example in the American patent U.S. Pat. No. 7,428,912 B1. Therein, it is therefore proposed to add, to a V-shaped joint, a system with a cone pushed axially by springs and allowing to maintain a regular pressure on the shaft. However, this system does not provide any compensation for the defects in circularity of both the shaft and the joint, which limits the sealing performance. Moreover, the high intrinsic rigidity of the lip of the joint limits the range of adjustment of the system.

Moreover, an atypical solution was presented by the Canadian company VELAN which consists of the use of a hydro-formed bellows mounted on a shaft having an angle. This solution allows only a quarter-turn movement of the shaft. Despite this restriction, this system allows to eliminate any sealing between two mobile parts with respect to one another. It nevertheless has numerous disadvantages. First of all, it is a complex system that requires a large height. Indeed, the system exploits the bending capacity of a mechanical bellows, by nature limited. It is easily increasable, but this involves also increasing the length of the bellows, and thus its bulk. Moreover, this assembly is notably costly and complex to create: in particular, the shape of the shaft requires using specific and complex machining processes. Moreover, the pressure resistance of this flexible element remains to be demonstrated.

Moreover, the French patent application FR 2 151 186 A1 discloses a flexible annular joint ensuring optimal sealing because of its ease in conforming to the surfaces against which it is applied. More precisely, the flexible metal joint comprises a core consisting of a metallic helical spring with touching turns closed onto itself and having the shape of a torus. A first envelope made of non-ductile metal, having the shape of a toric surface, allows the embedding of the spring, and a second envelope made of ductile metal, also having the shape of a toric surface, allows the embedding of the first envelope.

DISCLOSURE OF THE INVENTION

The goal of the invention is to at least partly resolve the needs mentioned above and the disadvantages relative to the embodiments of the prior art.

In particular, it aims to propose a metallic sealing assembly for a rotating shaft, combining compactness, high sealing performance and easily adjustable manoeuvring stress.

The object of the invention is therefore, according to one of its aspects, a metallic sealing assembly for sealing between a rotating shaft and a fixed frame of a receiving machine, characterised in that it includes:
  a flexible metallic sealing joint with two concentric tori having different average diameters, comprising:
    a first metallic helical spring with touching turns closed onto itself and substantially having, at rest, the shape of a torus, called inner torus,
    a second metallic helical spring with touching turns closed onto itself and substantially having, at rest, the shape of a torus, called outer torus, the outer torus having an average diameter greater than the average diameter of the inner torus, one of the inner and outer tori being positioned between a rotating part and a non-rotating part and thus being called "dynamic torus", and the other of the inner and outer tori being positioned between two parts not rotating with respect to one another and thus being called "static torus", a metallic envelope in which the inner torus and the outer torus are embedded and maintained, substantially having, at rest, the shape of a hollow torus comprising an inner housing and an outer housing, respectively for the embedding of the inner torus and of the outer torus, the surface of the envelope comprising an annular opening between the inner and outer housings, said envelope comprising:

an inner covering portion defining the inner housing and allowing the partial covering of the inner torus, an outer covering portion defining the outer housing and allowing the partial covering of the outer torus, an intermediate portion, called inter-tori, connecting the inner covering portion and the outer covering portion, formed facing the annular opening, a shaft rotating about an axis of rotation, comprising an annular shoulder against which the metallic sealing joint bears at the static torus, the metallic sealing joint positioned around the rotating shaft being centred via its inner diameter, a part called back, comprising a contact face, substantially flat, against which the metallic sealing joint bears at the dynamic torus, a spacer, positioned around the rotating shaft so that the metallic sealing joint is blocked between on the one hand the spacer and on the other hand the contact face of the back, the spacer being mounted on the rotating shaft in a sliding way along the axis of rotation of the rotating shaft, a metallic part forming a bonnet, which can optionally be the same as the spacer, covering the assembly comprising the metallic sealing joint and at least the contact face of the back, the bonnet being passed through by the rotating shaft and being fastened onto the frame and/or onto the back, on the exterior of the contact face, the rotating shaft being free in rotation with respect to the bonnet and axially rigidly connected to the bonnet.

The metallic sealing assembly according to the invention can further include one or more of the following features taken alone or according to all the technically possible combinations.

Advantageously, the metallic sealing joint corresponds to a specific embodiment of the sealing joint described in the French patent application FR 2 151 186 A1 described above.

According to a first alternative, the back can be a non-rotating part, intended to be fastened to the fixed frame. In this case, the assembly can include a sealing joint, in particular a static sealing joint, for example an O-ring, between the back and the frame.

According to a second alterative, the back can be a rotating part, rigidly connected to the rotating shaft at the shoulder. In this case, the assembly can include a sealing joint, in particular a static sealing joint, for example an O-ring, between the back and a shoulder of the rotating shaft as described below.

The contact face of the back can be rough, this roughness being in particular obtained via polishing.

The spacer can be blocked in rotation on the rotating shaft via a pinned and/or keyed link.

Moreover, the assembly can include a nut for clamping the spacer positioned so that the spacer is located between the clamping nut and the metallic sealing joint. The rotating shaft can thus include a threaded portion onto which the clamping nut can be screwed.

Moreover, the bonnet can include a plurality of first smooth holes extending along the axis of rotation and axially passing through the bonnet, intended to be positioned facing second threaded holes formed axially in the back and/or third threaded holes formed axially in the fixed frame, or intended to be positioned facing second smooth holes formed axially in the back and third threaded holes formed axially in the fixed frame. The assembly can include a plurality of threaded rods, each threaded rod being capable of being inserted into a first smooth hole as well as into a second smooth or threaded hole and/or a third threaded hole. The bonnet can be fastened onto the frame and/or onto the back by screwing of nuts onto the threaded rods in the top part of the bonnet.

According to a first alternative, the bonnet can comprise, in particular in the top part, a plurality of radial holes having the same diameter, extending substantially perpendicularly to the axis of rotation of the rotating shaft and opening onto the inner diameter of the bonnet so as to pass through it radially. Pins, having the same diameter as the radial holes, can be inserted into the radial holes. The rotating shaft can include a groove into which the pins penetrate to block the axial movement of the rotating shaft. A blocking element can optionally be positioned around the bonnet to prevent sliding of the pins towards the outside.

According to a second alternative, the bonnet can include on its inner diameter, at the centring of the rotating shaft, an inner thread. The rotating shaft can include, at the inner thread, a portion having a reduced diameter so as to create a blocking shoulder on the rotating shaft. The assembly can include a locking nut capable of being housed between the rotating shaft and the bonnet at the inner thread and the portion having a reduced diameter and of bearing against the blocking shoulder so as to axially block the movement of the rotating shaft.

Moreover, the spacer can be made in at least two parts, comprising a first part called inner spacer bearing on the inner torus, having a smooth inner diameter intended to slide on the rotating shaft and a threaded outer diameter, and a second part called outer spacer bearing on the outer torus, having a threaded inner diameter intended to be screwed onto the inner spacer.

Moreover, the surface of the spacer, in contact with the outer covering portion, can have a roughness greater than that of the contact face of the back.

The spacer can include a fold on its outer diameter allowing to cover the outer torus on its outer diameter.

The contact face of the back can have a female conical shape.

The metallic sealing joint can include, on its surface, a deposit of added material, in particular gold and/or silver.

The metallic envelope can be a first metallic envelope consisting of a material with a high mechanical strength, in particular an alloy of the Inconel® type. The metallic sealing joint can include a second metallic envelope wound onto the first metallic envelope and consisting of a material more ductile than that of the first metallic envelope, in particular silver, being intended to be plastically deformed during the crushing of the metallic sealing joint.

Moreover, the back can consist of at least three parts rigidly connected together, comprising an inner block provided with the contact face against which the metallic sealing joint bears at the outer torus, a bellows and an outer flange, the bellows conferring a degree of axial liberty to the assembly to not block possible differential expansions, the bellows connecting the inner block and the outer flange, the outer flange being fastened to the fixed frame.

Moreover, the bonnet can consist of at least two parts, comprising an outer bonnet fastened onto the fixed frame and an inner bonnet rigidly connected to the outer bonnet via a screwed link.

The metallic sealing assembly according to the invention can include any one of the features mentioned in the description, taken alone or according to all the technically possible combinations with other features.

BRIEF DESCRIPTION OF THE DRAWINGS

The invention can be better understood upon reading the following detailed description of non-limiting embodiments thereof as well as upon examining the drawings, schematic and partial, of the appended drawing, in which.

In all of these drawings, identical references can designate identical or analogous elements.

Moreover, the various parts shown in the drawings are not necessarily on a uniform scale, to make the drawings more readable.

DETAILED DISCLOSURE OF SPECIFIC EMBODIMENTS

Throughout the description, it is noted that the axial direction corresponds to the axis of rotation X of the rotating shaft 16. A radial direction is a direction perpendicular to the axis X. Moreover, unless otherwise noted, the adjectives and adverbs axial, radial, axially and radially are used in reference to the aforementioned axial and radial directions. Moreover, unless otherwise noted, the terms inner (or internal) and outer (or external) are used in reference to a radial direction so that the inner part of an element is closer to the axis X of the rotating shaft 16 than the outer part of the same element. Thus, an inner diameter is closer to the axis of rotation X that an outer diameter. For the same element, the inner diameter is the part of the diameter closest to the axis of rotation X and the outer diameter is the part of the diameter farthest from the axis of rotation X. Likewise, the inner torus 24 is closer to the axis of rotation X than the outer torus 25.

The present invention proposes a structure of a metallic sealing assembly 30 particularly adapted to a slow rotary movement of a shaft.

The assembly is built around two specific components which are the metallic sealing joint 1 and the back 14, described below.

It should be noted that in the assembly of FIGS. 1 to 12 relative to a non-rotating back 14, the inner torus 24 forms the static torus, blocked between two rotating parts constrained to rotate together, while the outer torus 25 forms the dynamic torus, blocked between a rotating part and a fixed part.

On the contrary, in the embodiment of FIG. 13 described below, relative to a rotating back 14, the inner torus 24 forms the dynamic torus while the outer torus 25 forms the static torus.

Figure 1:
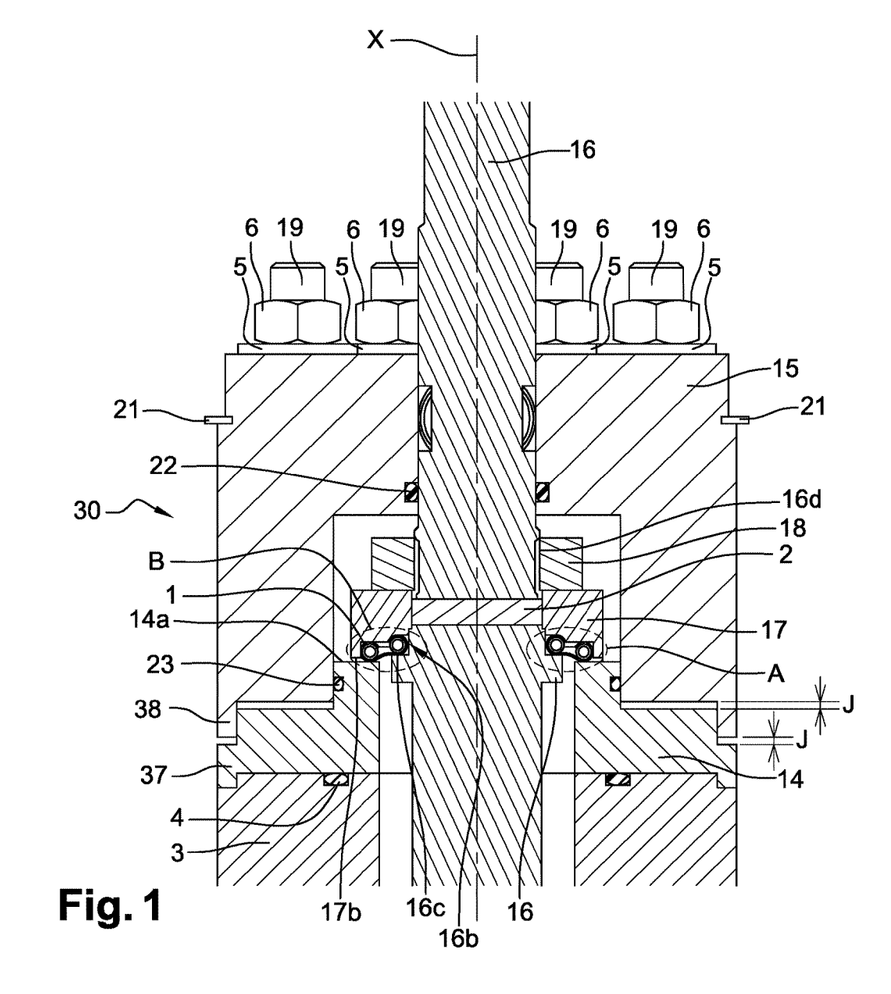
FIG. 1 shows a partial cross-sectional view of a first example of a metallic sealing assembly according to the invention.
Figure 1A:
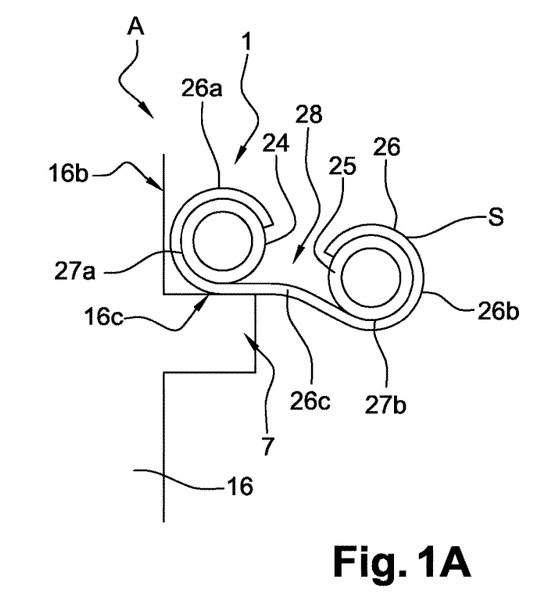
FIG. 1A is an enlarged and simplified view of the zone A of FIG. 1.

Thus, FIG. 1 shows a partial cross-sectional view of a first example of a metallic sealing assembly 30 according to the invention, and FIG. 1A is an enlarged and simplified view of the zone A of FIG. 1.

The assembly 30 is intended to allow the creation of sealing between a rotating shaft 16 and a fixed frame 3 of a receiving machine, or the body of the object comprising the assembly 30.

The assembly 30 includes first of all a flexible metallic sealing joint 1 with two concentric tori having different average diameters, this joint corresponding in particular to a double-tori sealing joint obtained according to the principle described in the French patent application FR 2 151 186 A1 described above.

As visible in FIG. 1A, the metallic sealing joint 1 thus includes a first metallic helical spring with touching turns closed onto itself and substantially having, at rest, the shape of a torus, called inner torus 24, and a second metallic helical spring with touching turns closed onto itself and substantially having, at rest, the shape of a torus, called outer torus 25. The outer torus 25 has an average diameter greater than the average diameter of the inner torus 24.

Moreover, the sealing joint 1 includes a metallic envelope 26, or metallic strip 26, in which the inner torus 24 and the outer torus 25 are embedded and maintained. This strip 26 substantially has, at rest, the shape of a hollow torus comprising an inner housing 27a and an outer housing 27b, respectively for the embedding of the inner torus 24 and of the outer torus 25. Moreover, the surface S of the strip 26 comprises an annular opening 28 between the inner 27a and outer 27b housings, formed in the upper part of the surface S of the strip 26.

Thus, the strip 26 covers the inner 24 and outer 25 tori. Three zones can be distinguished on the strip 26:

The latter includes first of all an inner covering portion 26a defining the inner housing 27a and allowing the partial covering of the inner torus 24. This inner covering portion 26a is wound around the inner torus 24, for example by flow turning, thus with a shape resembling a capital "C" open onto the outer diameter of the inner torus 24.

Moreover, the strip 26 includes an outer covering portion 26b defining the outer housing 27b and allowing the partial covering of the outer torus 25. This outer covering portion 26b is wound around the outer torus 25, for example by flow turning, thus with a shape resembling a capital "C" open onto the inner diameter of the outer torus 25.

Finally, the two lower ends of the two capital "Cs" thus formed by the inner covering portion 26a and the outer covering portion 26b are connected to each other via an intermediate portion 26c, called inter-tori 26c, thus connecting the inner covering portion 26a and the outer covering portion 26b, formed facing the annular opening 28 in the lower part of the surface S of the strip 26. This inter-tori zone 26c does not support a spring.

It should be noted that, via observation of a cross-section like in FIG. 1A, the inter-tori 26c can have a rectilinear shape but also, as shown by the example of FIG. 1A, a corrugated shape.

Moreover, the assembly 30 includes a shaft 16 rotating about an axis of rotation X. This rotating shaft 16 comprises an annular shoulder 7 against which the metallic sealing joint 1 bears at the inner torus 24, and more precisely bears against the surface 16c of the shoulder 7. The joint 1 is thus mounted on the shoulder 7, and positioned around the rotating shaft 16 while being centred via its inner diameter with the diametral surface 16b of the rotating shaft 16.

It should be noted that the shoulder 7 has a width, defined according to an axis perpendicular to the axis X, that is sufficient for being able to support the inner torus 24 by the bottom.

Moreover, it should also be noted that the inner diameter of the metallic sealing joint 1 is sufficiently large to allow sliding on the rotating shaft 16. It is thus possible to position the joint 1 on the shoulder 7. Upon the axial contact between the joint 1 and the shoulder 7, a first sealing line is created, once the inner torus 24 is compressed as explained below.

Moreover, the assembly 30 includes a spacer 17 that is slid, while being able to slide axially, around the rotating shaft 16 so that the metallic sealing joint 1 is blocked between on the one hand the spacer 17 and on the other hand the shoulder 7 of the rotating shaft 16 and the contact face 14a of the back 14 described below. The spacer 17 thus bears on the inner torus 24 from the top.

This spacer 17 can be blocked in rotation on the shaft via a pinned link and/or a keyed link. In this embodiment, the spacer 17 is blocked in rotation by a pin 2 entering into two opposite flutes, located on the inner diameter of the spacer 17.

Moreover, a nut 18 for clamping the spacer 17 is positioned around the rotating shaft 16 so that the spacer 17 is located between the clamping nut 18 and the metallic sealing joint 1. To do this, above the spacer 17, the rotating shaft 16 includes a threaded portion 16d onto which the clamping nut 18 is screwed. The tightening of the nut 18 allows to push the spacer 17 in the direction of the shoulder 7 and the compression of the inner torus 24 thus occurs. Also in this example, the spacer 17 covers the outer torus 25. Also, at the end of the compression, the spacer 17 is in contact or very close to the outer torus 25. Advantageously, the assembly 30 thus allows to compress the inner torus 24 without the latter being subjected to the rotation of the nut 18, which is usually not recommended for any metallic sealing joint.

Moreover, the assembly 30 includes a part called back 14, comprising a contact face 14a, substantially flat, against which the metallic sealing joint 1 bears at the outer torus 25.

In this embodiment, the back 14 is a non-rotating part fastened to the frame 3 of the receiving machine. Under the back 14, sealing is created with the frame 3 via a static sealing joint in the form of an O-ring 4.

The outer torus 25 is intended to come into contact with the contact face 14a of the back 14. In this specific example, this upper contact face 14a is covered with Stellite®. This contact face 14a is generally but not exclusively flat. It preferably has a very low roughness, obtained for example via precision polishing. It is positioned in such a way as to be facing the bottom of the outer torus 25.

The back 14 is preferably metallic. However, other materials can be used, for example such as ceramics, in particular tungsten carbides, silicon carbides, inter alia. Likewise, the contact face 14a can be coated, in particular before polishing, with a surface deposit facilitating sliding, for example a cermet or a Stellite® like in this example.

At the moment at which the rotating shaft 16, comprising the metallic sealing joint 1, is mounted, the geometric arrangement of the assembly makes it so that the outer torus 25 of the joint 1 bears on the contact face 14a. Since the joint 1 is fastened onto the rotating shaft 16, as a result, the outer torus 25 slides, during the rotations of the rotating shaft 16, on the contact face 14a.

To obtain on this outer torus 25 an adequate level of sealing, it is thus preferable to axially compress this torus 25. The system compressing the outer torus 25 must thus preferably rotate simultaneously with the rotating shaft 16. Indeed, if a metallic part compressing this torus 25 is static, the torus 25 would be greatly pinched axially. The rotation of the rotating shaft 16 would thus risk leading to a violent shearing, followed by a rupture of the inter-tori 16c.

Consequently, preferably, the spacer 17 also plays a role at the outer torus 25 during the compression. Its geometry makes it so that during the compression of the inner torus 24, it also comes in contact with the outer torus 25, opposite to the contact face 14a, or even covers it over a significant part of its height in certain preferred embodiments of the invention described below.

The compression of the outer torus 25 thus occurs between the mobile spacer 17 on the one hand and the fixed back 14 on the other hand. The stress of compression of the outer torus 25 thus passes through the rotating shaft 16.

To apply this stress onto the rotating shaft 16, the assembly 30 advantageously includes a metallic part forming a bonnet 15 covering the assembly comprising the spacer 17, the clamping nut 18, the metallic sealing joint 1 and at least the contact face 14a of the back 14. The bonnet 15 leaves the rotating shaft 16 free in rotation. However, it is axially rigidly connected to the rotating shaft 16 so as to create between them a rotary but non-translating link.

In its top part, the rotating shaft 16 passes through the bonnet 15 so as to allow the centring of the rotating shaft 16. In FIG. 1, the optional presence of two sealing O-rings 22 and 23 that can be integrated into the assembly 30 for purposes of performance tests should be noted. Moreover, a clearance J is provided between the bonnet 15 and the back 14.

Moreover, as visible in this FIG. 1, the bonnet 15 includes a fold 38 on its outer diameter that covers the outer diameter of the back 14. Likewise, the back 14 includes a fold 37 on its outer diameter that covers the outer diameter of the fixed frame 3.

The bonnet 15 can be fastened onto the frame 3 by nuts and bolts and/or directly onto the back 14, and preferably in this case on the outside of the contact face 14a. A link between the rotating shaft 16 and the bonnet 15, in its top part, constraining the two parts two move together axially but leaving the rotating shaft 16 free in rotation, for example like an assembly of bearings, is thus created.

Given the generally low speeds for the intended uses, a different assembly like according to the embodiment of FIG. 1 is preferably chosen.

Figure 2:
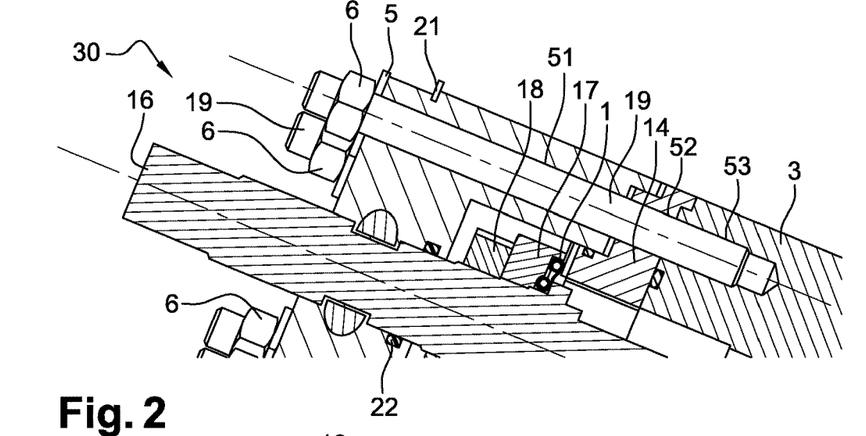
FIG. 2 shows another partial cross-sectional view of the assembly of FIG. 1 allowing to view the fastening of the bonnet onto the back and the frame.
Figure 3:
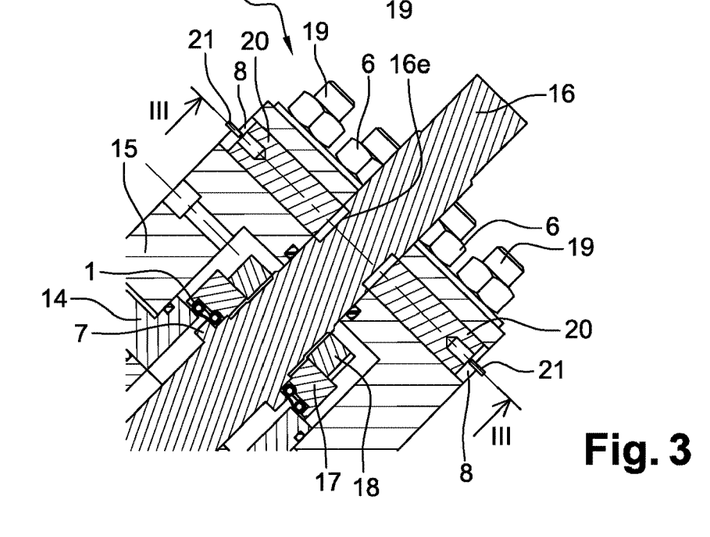
FIG. 3 shows yet another partial cross-sectional view of the assembly of FIG. 1 allowing to view the principle of the axial blocking of the rotating shaft.
Figure 4:
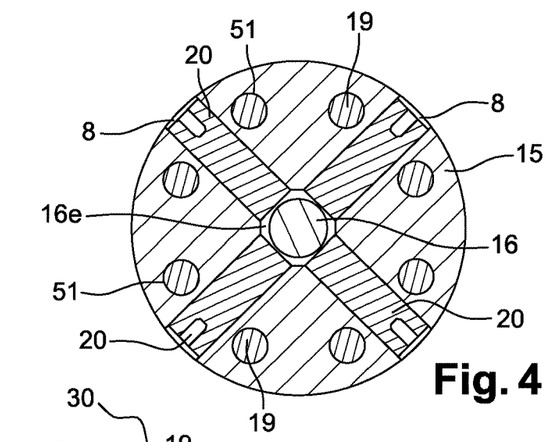
FIG. 4 is a view along III-Ill of FIG. 3.

Thus, FIGS. 2 to 4 allow to better understand the mode of clamping the assembly. As visible in FIG. 2 for example, the bonnet 15 includes a plurality of first smooth holes 51 extending according to the axis of rotation X and passing axially through the bonnet 15. These first smooth holes 51 are positioned facing second smooth holes 52 formed axially in the back 14, themselves facing third threaded holes 53 formed axially in the fixed frame 3.

The assembly 30 further includes a plurality of threaded rods 19 that pass through the bonnet 15, the back 14 and the frame 3 to be blocked in the smooth 51, 52 and threaded 53 holes. The bonnet 15 is thus fastened onto the frame 3 by screwing of nuts 6 onto the threaded rods 19 in the top part of the bonnet 15, washers 5 being positioned here between the nuts 6 and the bonnet 15.

Moreover, the bonnet 15 comprises in the top part a plurality of radial holes 8, here four, having the same diameter, extending perpendicularly to the axis of rotation X and opening onto the inner diameter of the bonnet 15 so as to pass through it radially. Pins 20, having the same diameter as the radial holes 8, are inserted into the radial holes 8.

The rotating shaft 16 is positioned in such a way that the pins 20 enter a groove 16e machined in the shaft, the width of which is equal to the diameter of the pins 20 increased by a slight clearance. The pins 20 enter the groove 16e and thus block the axial movement of the rotating shaft 16. Via the slight clearance, the rotation remains free.

Moreover, a blocking element 21, called "circlip", is then positioned around the bonnet 15 to avoid the pins 20 sliding out. Once this is carried out, the rods 19 are blocked using the nuts 6. The torque applied allows to adjust the stress on the outer torus 25. The level of sealing and the resistive torque in rotation can thus be adjusted together.

During the tightening of the bonnet 15, the assembly formed by the shaft 16, the sealing joint 1, the nut 18 and the spacer 17 is thus driven, and the outer torus 25 is crushed on the contact face 14a of the back 14. The assembly is then ready to rotate.

It is known that during the rotation, it is important to preserve a great closeness between the outer torus 25 and the contact face 14a, with the goal of obtaining high-level sealing. Since the contact face 14a is preferably not completely flat, or in general not completely regular, the turns of the spring thus allow to continuously follow the corrugations of the surface, and thus to obtain this closeness at any time. As for the inner sealing, it is carried out on the static inner torus 24.

The adjustment of the compression stress on the outer torus 25 is carried out purely axially: it is not therefore necessary to counter the rigidity of cylindrical elements radially. Thus, the adjustment is easy and it is possible to optimise the pair formed by the level of sealing and the manoeuvring stress. Indeed, the manoeuvring stress is directly related to the compression stress, via the tangential friction stress thus generated.

Figure 8:
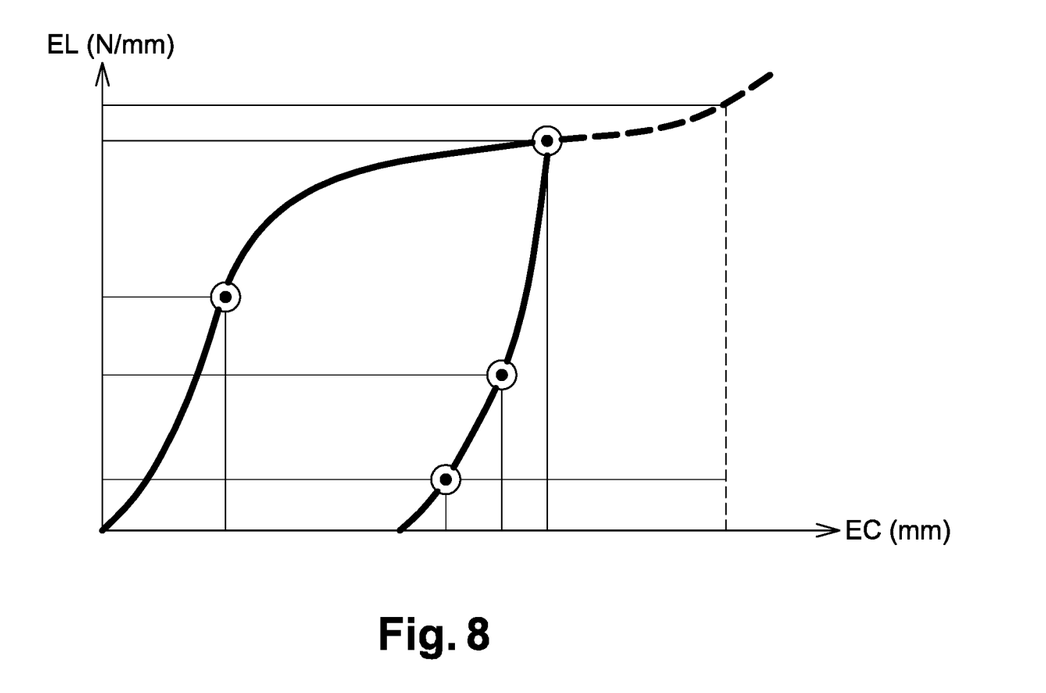
FIG. 8 shows a typical compression curve of the change in the stress per length unit according to the crushing for a metallic sealing joint of the prior art.

An industrial optimisation of this principle of the invention involves the creation of metal/metal contact between the bonnet 15 and the part onto which it is screwed, namely the back 14 or the frame 3, to adjust the compression of the outer torus 25. The metallic sealing joint 1 is thus compressed to a predetermined dimension. This allows to increase the clamping torque after obtaining the contact and avoid any lift during increases to high pressure. This is acceptable insofar as typically a curve of change in the stress per length unit EL, expressed in $N \cdot mm^{-1}$, according to the crushing EC, expressed in mm, as shown in FIG. 8, of a metallic sealing joint of the type of that described in the French patent application FR 2 151 186 A1, and applicable to the metallic sealing joint 1 of the assembly 30 according to the invention, has a flat plateau at the end of the compression, hence an adaptability to large housing clearances.

Moreover, it is important that during the rotation, the outer torus 25 be able to slide on the back 14 and not slide however at its interface with the spacer 17. Thus, FIG. 5 allows to illustrate an improvement of the invention for which the spacer surface 17a of the spacer 17, in contact with the outer covering portion 26b, has a roughness greater than that of the contact face 14a of the back 14, the latter being smooth. It is thus sought to promote blocking in the spacer 17 and sliding on the back 14.

Figure 5:
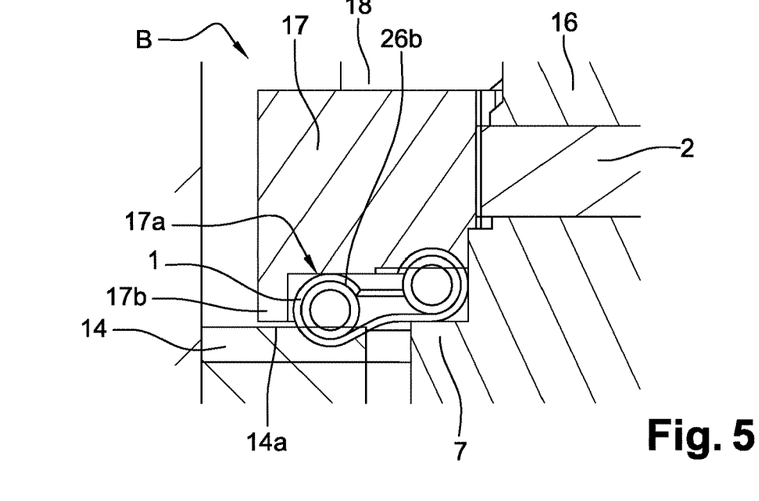
FIG. 5 is an enlarged and simplified view of the zone B of FIG. 1.

Moreover, when the pressure of the fluid pushes from the inside, there is a risk of deformation of the outer torus 25, or even a risk of pushing the latter. Thus, a small fold 17b formed on the outer diameter of the spacer 17 allows to cover the outer torus 25 on its outer diameter. The height of the fold 17b is less than the compressed dimension of the sealing joint 1, without which the fold 17b would rub on the contact face 14a and would prevent the proper compression of the outer torus 25. Advantageously, the mounting is thus provided to preserve by structure a minimal axial clearance between this fold 17b and the contact face 14a.

A disadvantage of the assembly 30 can involve the presence of the axial blocking of the rotating shaft 16 with respect to the frame 3 of the receiving machine, which can occur in particular in two cases: if the bonnet 15 is fastened directly onto the frame 3; if the bonnet 15 is fastened onto the back 14, and the back 14 is rigidly fastened onto the frame 3. During uses at high or low temperatures, it is thus possible to observe differential expansions between the frame 3 and the rotating shaft 16. The presence of the blocking is opposed to this phenomenon, which can be disadvantageous.

Moreover, it is routine for the axial position of the rotating shaft 16 to be determined by other mechanical elements. For example, in a ball valve, the ball rigidly linked to the shaft self-adjusts with internal mechanical elements. The axial position of the shaft is a result to which it is necessary to adapt.

One solution thus involves linking the back 14 to a part of the axial bellows type, itself connected to the frame 3. Thus, in another embodiment of the invention, as visible in reference to FIGS. 6 and 7, the back 14 consists of three parts rigidly connected together, machined together or welded to each other. The back 14 thus comprises an inner block 11 provided with the contact face 14a against which the metallic sealing joint 1 bears at the outer torus 25, a bellows 12 and an outer flange 13.

Figure 6:
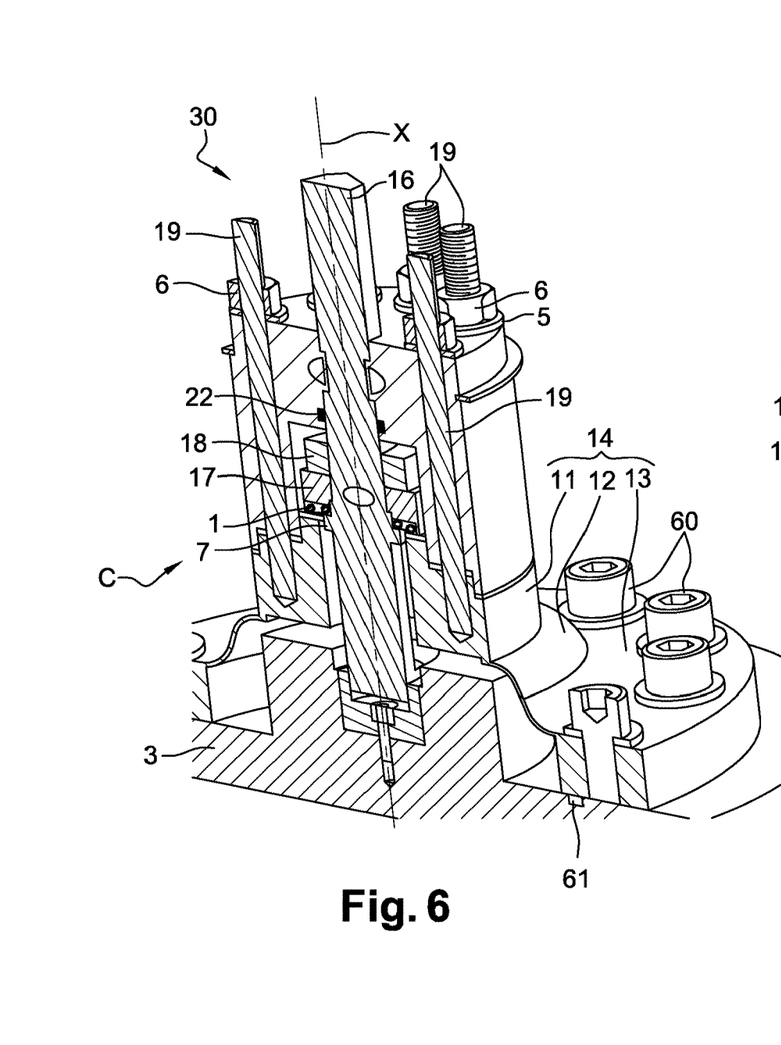
FIG. 6 shows a partial cross-sectional and perspective view of a second example of a metallic sealing assembly according to the invention, comprising a bellows for compensating for expansion.
Figure 7:
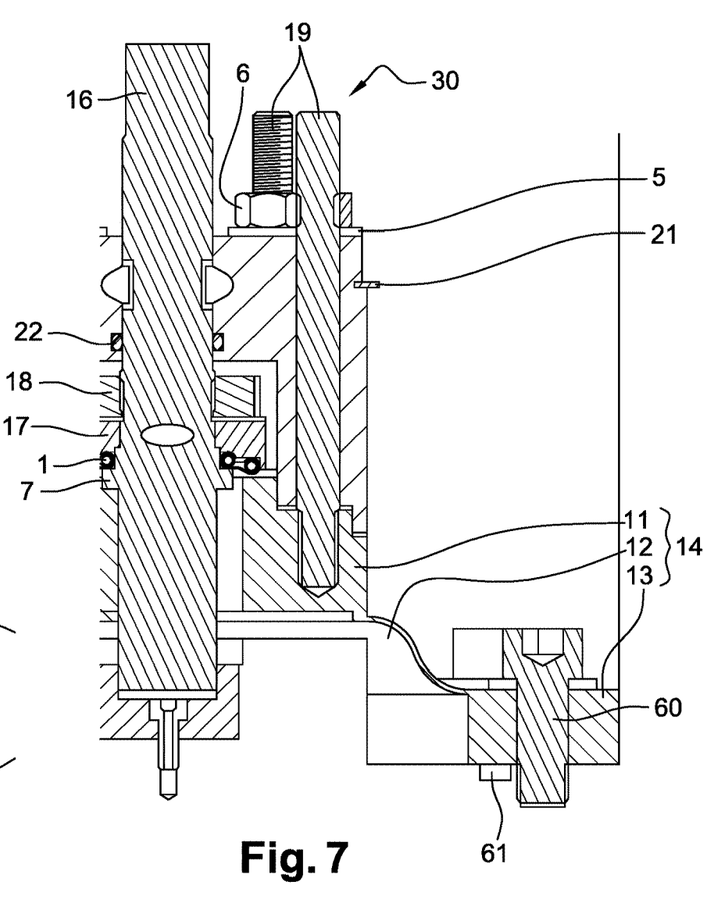
FIG. 7 is a partial view according to C of FIG. 6.

The outer flange 13 is fastened onto the fixed frame 3 via bolts 60. A sealing joint is inserted into the groove 61 to guarantee the sealing. The threaded rods 19 are this time screwed directly onto the inner block 11, and not onto the frame 3 like above. The bellows 12 confers a degree of axial freedom to the assembly 30 to not block possible differential expansions, the bellows 12 connecting the inner block 11 and the outer flange 13. The bellows 12 can be hydroformed, with welded blades, or even machined from a solid with the back 14.

Figure 9A:
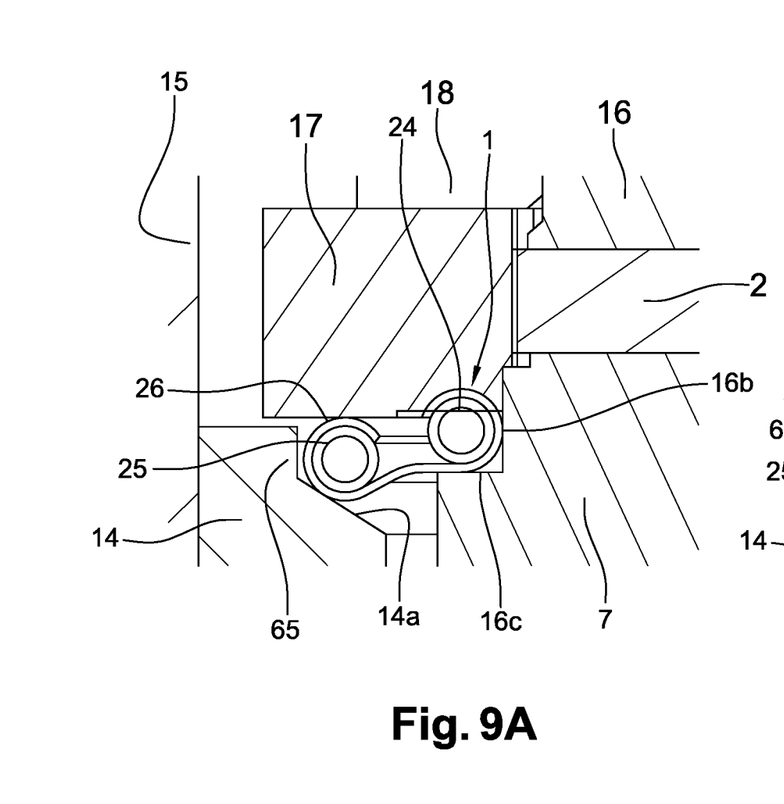
FIGS. 9A and 9B show in a partial cross-section alternative embodiments of non-flat shapes of the contact face of the back.
Figure 9B:
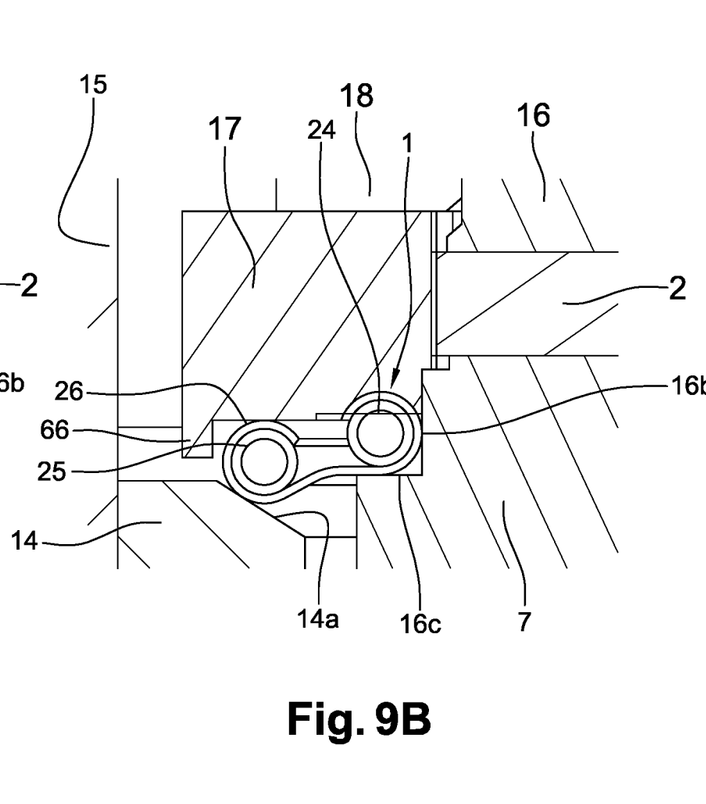

Moreover, FIGS. 9A and 9B allow to view the fact of having a contact face 14a of the back 14 that has a female conical shape, typically for uses with a high internal pressure. The outer torus 25 is alternatingly in contact with the contact face 14a having a conical shape, and the folds 65 and 66 also help with the pressure resistance. The slope thus created limits by itself the radial movements and the folds 65, 66 can act as an ultimate stop if necessary.

Figure 10:
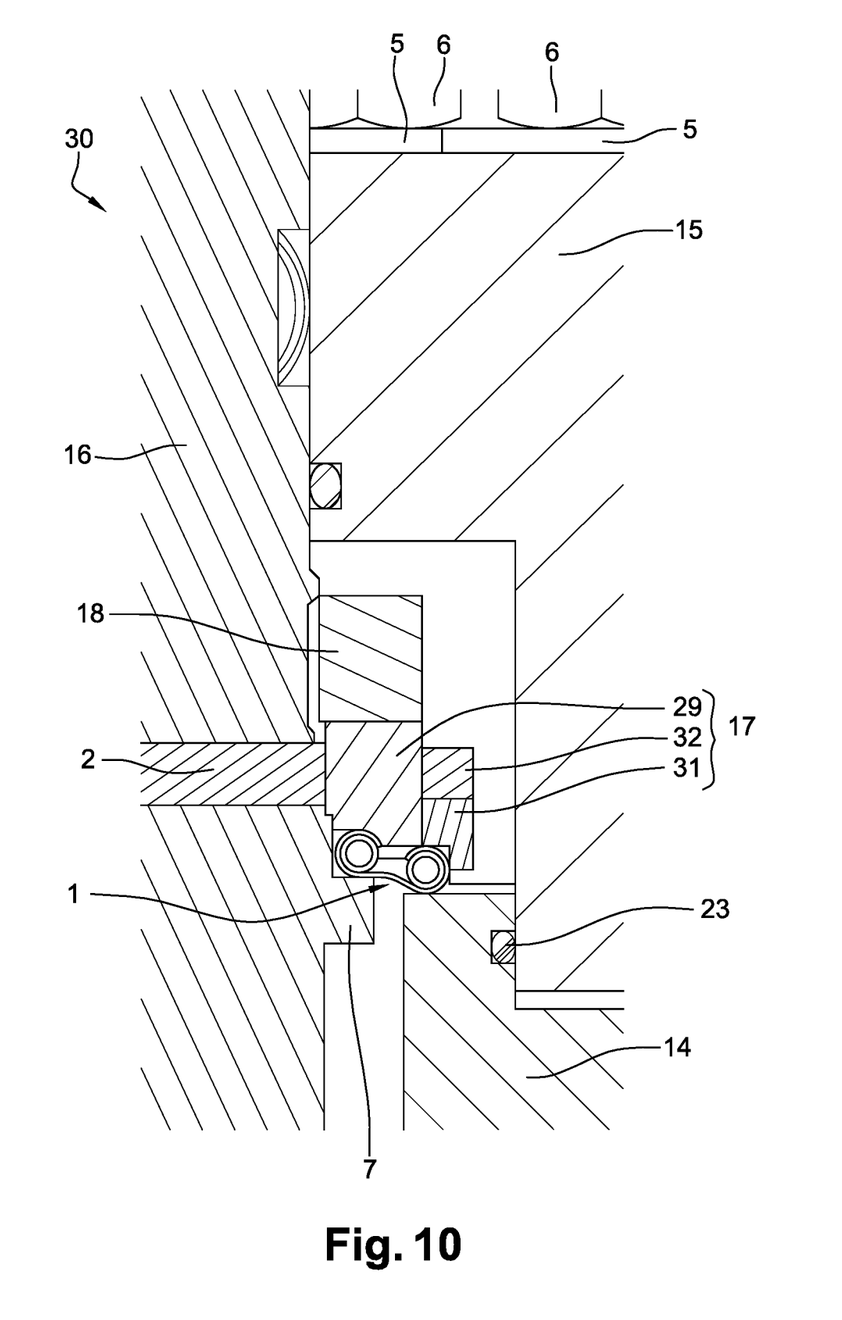
FIGS. 10 to 12 show partial cross-sectional views of other embodiments of a metallic sealing assembly according to the invention.

Moreover, FIG. 10 illustrates the fact of having a spacer 17 divided into three parts. Thus, the spacer 17 comprises a first part called inner spacer 29 bearing on the inner torus 24, having a smooth inner diameter and intended to slide on the rotating shaft 16. The inner spacer 29 includes a threaded outer diameter. Its value is located between that of the outer diameter of the inner torus 24 and that of the inner diameter of the outer torus 25. Moreover, the spacer 17 comprises a second part called outer spacer 31 bearing on the outer torus 25, having a threaded inner diameter and intended to be screwed onto the inner spacer 29. This screwed link allows to adjust during the mounting the position of the two inner 29 and outer 31 spacers, which can be useful to compensate for the randomness related to the dimensional variations of the various components. Moreover, once the adjustment has been carried out, the spacer 17 comprises a locknut 32 that allows to set this adjustment.

In general, optimisations can allow to preadjust the crushing of the outer torus 25 before mounting. Another concept is illustrated in reference to FIG. 11 which involves replacing the system having radial pins 20. Thus, the bonnet 15 includes on its inner diameter, at the centring of the rotating shaft 16, an inner thread 34, and the rotating shaft 16 includes, at the inner thread 34, a portion having a reduced diameter 35 so as to create a blocking shoulder 27 on the rotating shaft 16.

Figure 11:
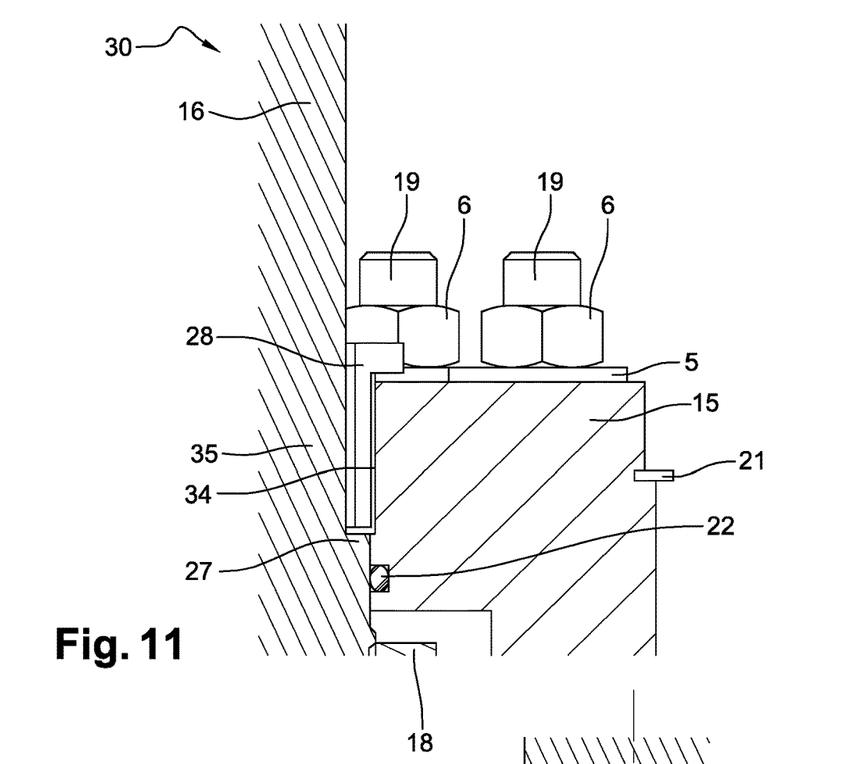

Moreover, the assembly 30 includes a locking nut 28 capable of being housed between the rotating shaft 16 and the bonnet 15 at the inner thread 34 and the portion having a reduced diameter 35 and of bearing against the blocking shoulder 27 so as to axially block the movement of the rotating shaft 16. A locknut (not shown) can allow to block the assembly to avoid any unscrewing/overscrewing during the rotations of the rotating shaft 16.

Moreover, in the case in which the problem of differential expansion does not arise, and it is sought just to adapt to an axial position of the shaft 16 "undergone" because of adjustment of other components, it is also possible to separate the bonnet in two.

Figure 12:
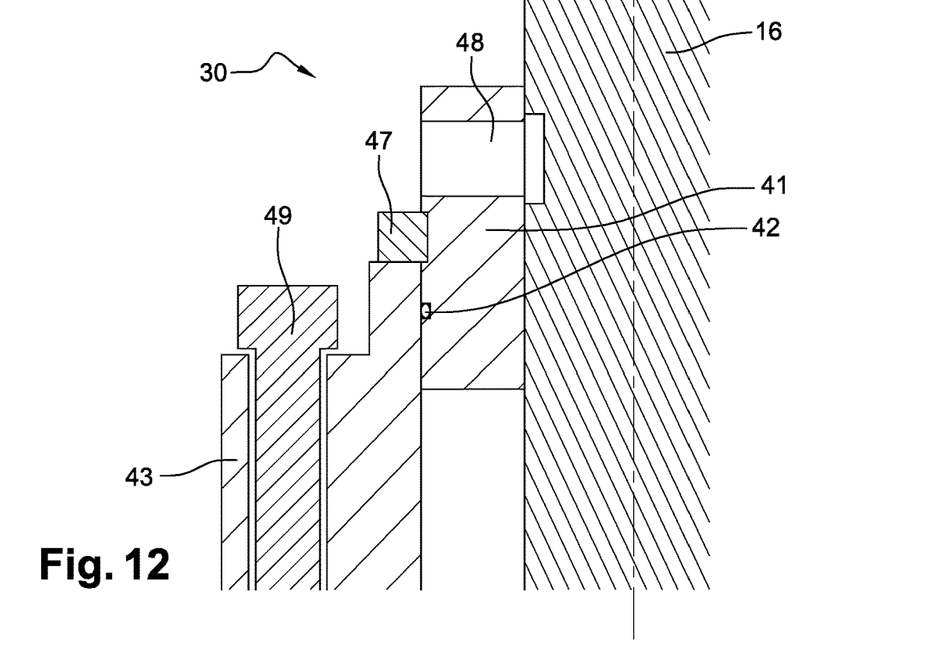

Thus, FIG. 12 shows an alternative embodiment in which the bonnet 15 is separated into two parts. It comprises an outer bonnet 43 fastened onto the frame 3, the outer bonnet 43 including orifices for the passage of nuts and bolts 49 allowing the fastening to the frame 3. The outer bonnet 43 is linked to an inner bonnet 41 via a screwed link 42. The inner bonnet 41 comprises a non-adjustable link with the rotating shaft 16, such as an assembly of bearings, a system of pins, inter alia. Here, this is a system of pins 48. The threaded or screwed link 42 between the inner bonnet 41 and the outer bonnet 43 allows to adjust the height of the bonnet 15 and to preposition the pins 48 in terms of height to adapt to the axial position of the rotating shaft 16. Once the adjustment has been carried out, a locknut 47 can allow to block the adjustment.

Moreover, it should be noted that in such an assembly 30 according to the invention, a torsion torque can be created between the inner 24 and outer 25 tori. During the tunings, it is thus sought to limit the friction between the outer torus 25 and the contact face 14a of the back 14. This can for example be done by placing a deposit on the sealing joint 1, for example such as a deposit of gold or of silver. In addition, the latter has the advantage of increasing the sealing performance given its surface flexibility.

Moreover, in certain embodiments of the invention, the metallic sealing joint 1 can have two envelopes or coatings one encircled on the other. The first winding or first envelope 26, in contact with the springs, consists for example of a material with a high mechanical strength, in particular an alloy of the Inconel® type, to give mechanical cohesion to the joint 1, and the second winding is made from a more ductile material, in particular silver, intended to be plastically deformed upon contact with the sealing surfaces to reduce the leakage rates.

Of course, the invention is not limited to the embodiments that have just been described. Various modifications can be made thereto by a person skilled in the art.

Figure 13:
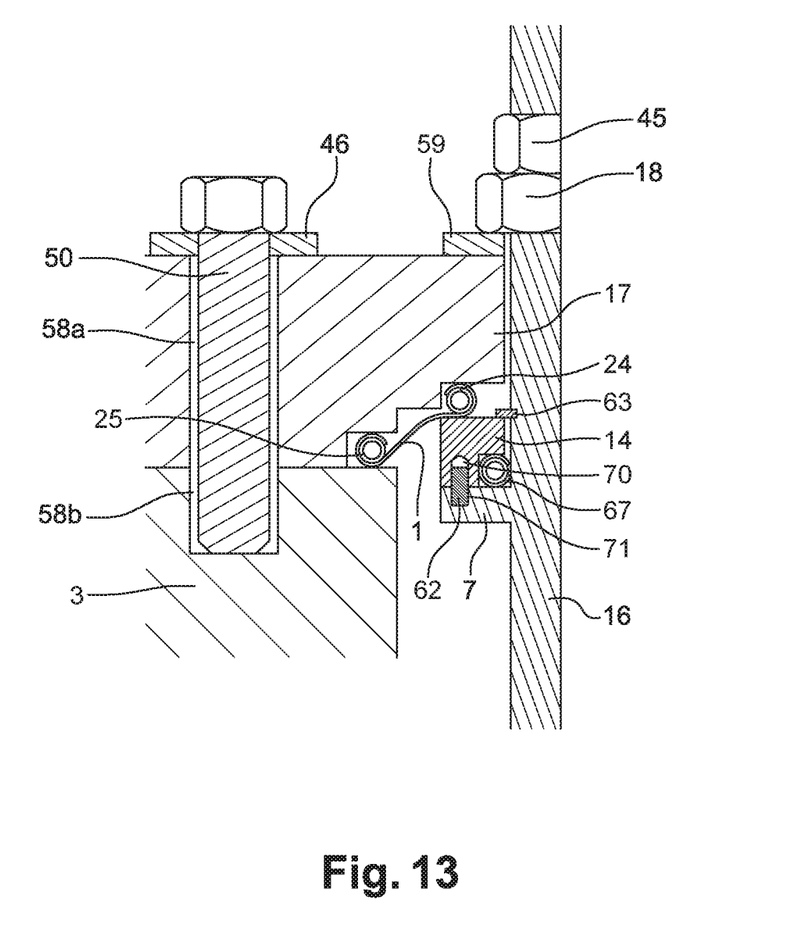
FIG. 13 illustrates, schematically in a partial cross-section, an embodiment of a metallic sealing assembly according to the invention in which the back is a rotating part, rigidly connected to the rotating shaft at its shoulder.

In particular, the back 14 can be a rotating part, rigidly connected to the rotating shaft 16 at the shoulder 7, as illustrated in FIG. 13.

In this FIG. 13, the back 14 is rotated with the rotating shaft 16 via a driving pin 62 positioned in housings 70 and 71 respectively of the back 14 and of the shoulder 7.

Moreover, the assembly includes a secondary sealing joint 67, in particular a static sealing joint, for example an O-ring, between the back 14 and the shoulder 7. This sealing joint 67 can in particular correspond to a specific embodiment of the sealing joint described in the French patent application FR 2 151 186 A1 described above.

Moreover, a secondary blocking element 63, called "circlip", is positioned in contact with the back 14 and the rotating shaft 16 in such a way that the back 14 is located between this blocking element 63 and the sealing joint 67.

In this example, the inner torus 24 acts as a dynamic torus. The latter is in contact with the surface 14a of the back 14.

Also in this example, the spacer 17 acts as the bonnet 15 so that the spacer 17 and the bonnet 15 correspond here to the same structural element.

Moreover, the spacer 17 and the frame 3 respectively include orifices 58 and 58b, in particular threaded orifices, for the passage of means for fastening between the spacer 17 and the frame 3, such as a threaded rod 50. Thus, the frame 3 and the spacer 17 are fastened together and do not rotate.

Metallic washers 46 and 59 are provided at the threaded rod 50 and also between the spacer 17 and the nut 18 above which there is a locknut 45 to maintain the assembly. More precisely, a preferably sliding metallic washer 59 can be provided between the nut 18 and the spacer 17, while an ordinary metallic washer 46 can be provided at the threaded rod 50.

What is claimed is:

1. Metallic sealing assembly for sealing between a rotating shaft and a fixed frame of a receiving machine, comprising:
   a flexible metallic sealing joint with two concentric tori having different average diameters, comprising:
      a first metallic helical spring with touching turns closed onto itself and having, at rest, the shape of a torus, called inner torus,
      a second metallic helical spring with touching turns closed onto itself and having, at rest, the shape of a torus, called outer torus, the outer torus having an average diameter greater than the average diameter of the inner torus, one of the inner and outer tori being positioned between a rotating part and a non-rotating part and thus being called "dynamic torus", and the other of the inner and outer tori being positioned between two parts not rotating with respect to one another and thus being called "static torus", a metallic envelope in which the inner torus and the outer torus are embedded and maintained, having, at rest, the shape of a hollow torus comprising an inner housing and an outer housing, respectively for the embedding of the inner torus and of the outer torus, the surface of the envelope comprising an annular opening between the inner and outer housings, said envelope comprising:

an inner covering portion defining the inner housing and allowing the partial covering of the inner torus, an outer covering portion defining the outer housing and allowing the partial covering of the outer torus, an intermediate portion, called inter-tori, connecting the inner covering portion and the outer covering portion, formed facing the annular opening, a shaft rotating about an axis of rotation, comprising an annular shoulder against which the metallic sealing joint bears at the static torus, the metallic sealing joint positioned around the rotating shaft being centred via its inner diameter, a part called back, comprising a contact face, flat, against which the metallic sealing joint bears at the dynamic torus, a spacer, positioned around the rotating shaft so that the metallic sealing joint is blocked between on the one hand the spacer and on the other hand the contact face of the back, the spacer being mounted on the rotating shaft in a sliding way along the axis of rotation of the rotating shaft, a metallic part forming a bonnet covering the assembly comprising the metallic sealing joint and at least the contact face of the back, the bonnet being passed through by the rotating shaft and being fastened onto the frame and/or onto the back, on the exterior of the contact face, the rotating shaft being free in rotation with respect to the bonnet and axially rigidly connected to the bonnet.

2. Assembly according to claim 1, wherein the back is a non-rotating part, intended to be fastened to the fixed frame.

3. Assembly according to claim 1, wherein the contact face of the back is rough.

4. Assembly according to claim 1, wherein the spacer is blocked in rotation on the rotating shaft via a pinned and/or keyed link.

5. Assembly according to claim 1, further comprising a nut for clamping the spacer positioned so that the spacer is located between the clamping nut and the metallic sealing joint, the rotating shaft including a threaded portion onto which the clamping nut is screwed.

6. Assembly according to claim 1, wherein the bonnet includes a plurality of first smooth holes extending along the axis of rotation and axially passing through the bonnet, intended to be positioned facing second threaded holes formed axially in the back and/or third threaded holes formed axially in the fixed frame, or intended to be positioned facing second smooth holes formed axially in the back and third threaded holes formed axially in the fixed frame, and wherein the assembly includes a plurality of threaded rods, each threaded rod being capable of being inserted into a first smooth hole as well as into a second smooth or threaded hole and/or a third threaded hole, the bonnet being fastened onto the frame and/or onto the back by screwing of nuts onto the threaded rods in the top part of the bonnet.

7. Assembly according to claim 1, wherein the bonnet comprises, in the top part, a plurality of radial holes having the same diameter, extending perpendicularly to the axis of rotation and opening onto the inner diameter of the bonnet so as to pass through it radially, wherein pins, having the same diameter as the radial holes, are inserted into the radial holes, and wherein the rotating shaft includes a groove into which the pins penetrate to block the axial movement of the rotating shaft, a blocking element being positioned around the bonnet to prevent sliding of the pins towards the outside.

8. Assembly according to claim 1, wherein the bonnet includes on its inner diameter, at the centring of the rotating shaft, an inner thread, and wherein the rotating shaft includes, at the inner thread, a portion having a reduced diameter so as to create a blocking shoulder on the rotating shaft, the assembly including a locking nut capable of being housed between the rotating shaft and the bonnet at the inner thread and the portion having a reduced diameter and of bearing against the blocking shoulder so as to axially block the movement of the rotating shaft.

9. Assembly according to any one of the previous claim 1, wherein the spacer is made in at least two parts, comprising a first part called inner spacer bearing on the inner torus, having a smooth inner diameter intended to slide on the rotating shaft and a threaded outer diameter, and a second part called outer spacer bearing on the outer torus, having a threaded inner diameter intended to be screwed onto the inner spacer.

10. Assembly according to claim 1, wherein the spacer surface of the spacer, in contact with the outer covering portion, has a roughness greater than that of the contact face of the back.

11. Assembly according to claim 1, wherein the spacer includes a fold on its outer diameter allowing to cover the outer torus on its outer diameter.

12. Assembly according to claim 1, wherein the contact face of the back has a female conical shape.

13. Assembly according to claim 1, wherein the metallic sealing joint includes, on its surface, a deposit of added material, gold and/or silver.

14. Assembly according to claim 1, wherein the metallic envelope is a first metallic envelope consisting of a material with a high mechanical strength, and wherein the metallic sealing joint includes a second metallic envelope wound onto the first metallic envelope and consisting of a material more ductile than that of the first metallic envelope, being intended to be plastically deformed during the crushing of the metallic sealing joint.

15. Assembly according to claim 1, wherein the back consists of at least three parts rigidly connected together, comprising an inner block provided with the contact face against which the metallic sealing joint bears at the outer torus, a bellows and an outer flange, the bellows conferring a degree of axial liberty onto the assembly to not block possible differential expansions, the bellows connecting the inner block and the outer flange, the outer flange being fastened to the fixed frame.

16. Assembly according to claim 1, wherein the bonnet consists of at least two parts, comprising an outer bonnet fastened onto the fixed frame and an inner bonnet rigidly connected to the outer bonnet via a screwed link.

17. Assembly according to claim 1, wherein the back is a rotating part, rigidly connected to the rotating shaft at the shoulder.

\* \* \* \* \*